3,706,596
PROCESS AND COMPOSITION FOR THE MANUFACTURE OF OXIDATION RESISTANT GRAPHITE ARTICLES

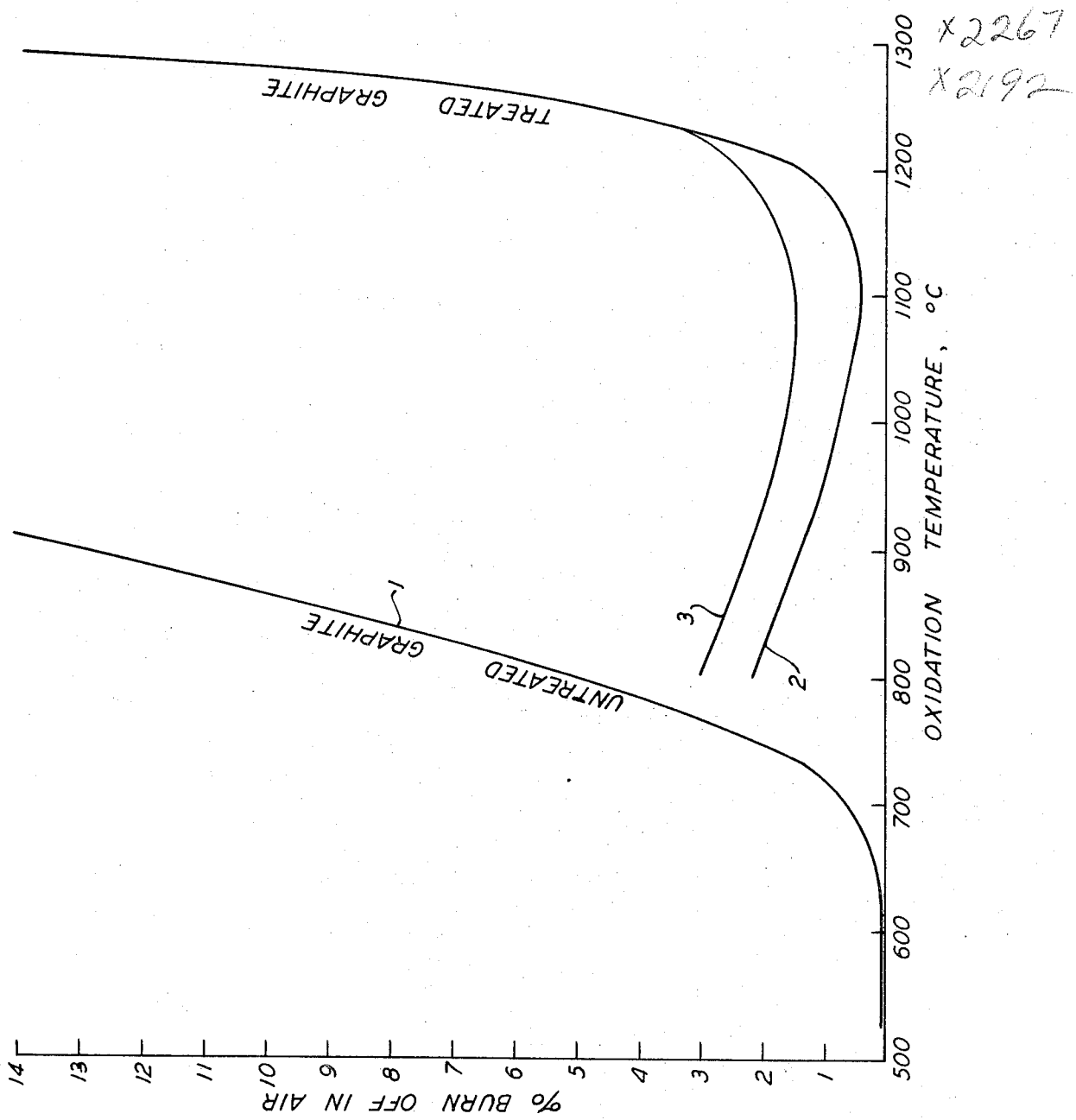

Rudolph W. Wallouch, Lewiston, N.Y., assignor to Airco, Inc., New York, N.Y.
Filed Dec. 24, 1970, Ser. No. 101,218
Int. Cl. B44d 1/02, 1/20
U.S. Cl. 117—169 A                8 Claims

---

ABSTRACT OF THE DISCLOSURE

Increased oxidation resistance properties are enabled in a graphite article by a process according to which the said article is impregnated with an aqueous colloidal dispersion of particulate silica and with a solution of methyl alcohol containing boric oxide and phosphorous pentoxide in the form of methyl borate and methyl phosphate esters. Following said impregnation the article is dried, and—where high temperature use (up to 1200° C.) is contemplated—fired to 1100° C. in an inert atmosphere. In addition to the process set forth, the graphite products resulting therefrom are claimed, as is the impregnant per se.

---

BACKGROUND OF INVENTION

This invention relates generally to carbon and graphite technology, and more specifically relates to improvement of the oxidation resistance properties of carbon and graphite articles.

Within recent years carbon and graphite materials and products have come into ever increasing favor for use in environments where the generally refractory nature of these materials is advantageous. Unfortunately, however, one of the counterfactors limiting application of such carbonaceous materials, is that they are not particularly resistant to oxidation, particularly at temperatures in excess of 500° C.

In the low temperature range (about 375° C. to 600° C.) it is known to impregnate a carbon or graphite body with carbonaceous material such as coal tar pitch or with various natural or synthetic resins, and thereafter carbonize the impregnant. Within the low temperature use range indicated such procedures are reasonably effective in retarding the penetrating air oxidation of graphite or carbon, by virtue of the procedure reducing the accessible pore volume in the materials treated.

In the intermediate temperature range (600° C. to 800° C.), organic and inorganic phosphates are known to be reasonably effective oxidation inhibitors for graphite and carbon bodies. In this connection it may be observed that an oxidation inhibitor, in order to be effective at such temperatures, must be incorporated into the accessible pores of the body. The mechanism by which inhibitors affect the oxidation of carbonaceous materials comprises both chemical and physical processes. The effectiveness of phosphates, for instance, arises from their capability of forming a viscous phase below the oxidation temperature, which in turn covers potentially active sites on the inside surface of the carbon or graphite by a strongly chemisorbed layer. Other factors which determine the effectiveness of a given treatment include the chemical composition of the impregnant, the concentration of the starting solution, the amount of material deposited within the pore system, and the distribution of the treatment within the carbonaceous material. Unfortunately, most metal phosphates are thermally unstable and lose their effectiveness as an oxidation retardant by decomposition or sublimation at about 750° C.

In the high temperature range, between about 800° C. to 1200° C., metal silicates in principle serve as effective inhibitors of oxidation in carbon and graphite bodies. However, the main problem with metal silicates is that they are for all practical purposes insoluble in water or in other common solvents, and therefore cannot be readily vacuum-pressure impregnated into the accessible pore volume of the body treated. Furthermore, the use of water soluble sodium silicate (water glass) is undesirable since sodium enhances rather than inhibits the rate of oxidation of carbon and graphite.

In accordance with the foregoing, it may be regarded as an object of the present invention to provide an impregnation process for carbon and graphite bodies, which results in vastly improved properties of oxidation resistance for such bodies, both in the intermediate temperature use range, and more particularly in the high temperature use range extending from about 800° C. to about 1200° C.

It is a further object of the invention, to provide impregnants and processes for the application of such impregnants to carbon and graphite bodies, such that the impregnation of such bodies is simply and effectively carried out.

It is another object of the invention, to provide impregnated carbon and graphite bodies possessing vastly improved properties of oxidation resistance, in consequence of which such products may be effectively utilized in the presence of standard atmospheric conditions and in the presence of temperatures ranging to 1200° C. or higher.

It is a yet further object of the invention, to provide methods and compositions yielding an oxidation retarding deposit at a treated carbon or graphite body, which deposit is non-hygroscopic, does not fume at elevated temperatures, is a stable compound at temperatures even well in excess of 1200° C., and protects the treated body from oxidation up to 1200° C. or higher.

SUMMARY OF INVENTION

Now in accordance with the present invention, the foregoing objects, and others as will become apparent in the course of the ensuing specification, are achieved via a process wherein a carbon or graphite article is impregnated by differential pressure techniques with an aqueous colloidal dispersion of particulate silica, and with a solution of methyl alcohol containing boric oxide and phosphorous pentoxide—the latter two substances being present in the alcohol solution in the form of methyl borate and methyl phosphate esters. Following the vacuum-pressure impregnation the treated article is dried. Where the treated body is to be used at the high temperature range (800° C.—1200° C.) previously cited, the impregnated article is then fired in an inert atmosphere at temperatures of the order of 1100° C. Such firing appears to convert the boric oxide, phosphorous pentoxide, and silicon dioxide substances deposited in the pores of the treated body into an oxidation inhibiting glaze which does not react with the moisture in the air.

BRIEF DESCRIPTION OF DRAWINGS

In the drawing appended hereto:

The figure is a graph depicting oxidation rates for a sample of untreated graphite, and for representative graphite samples treated in accordance with the invention, as a function of oxidation temperature.

DESCRIPTION OF PREFERRED EMBODIMENT

In the ensuing specification, the present invention will be particularly described in connection with its application to graphite products, such as for example machined graphite or the like. It will, however, be appreciated throughout, that the techniques set forth are equally applicable to carbonaceous products which are non-graphitic or only partially graphitic in nature, such as for example baked carbon products which have not been exposed to a full schedule of graphitization.

In accordance with the preferred mode of practicing the invention, the impregnation procedure comprises two sequential impregnation steps. During the first step the body to be treated is impregnated by differential pressure techniques with an aqueous dispersion of colloidal silica. The body is then heat dried to precipitate the colloidal silica in the pores of the body. Subsequently, in the second impregnation step, further vacuum-pressure impregnation is used to reimpregnate the body with a methyl alcohol solution containing boric oxide and phosphorous pentoxide in the form of methyl borate and methyl phosphate esters. The body is thereafter dried by heat curing, and—if intended for intermediate temperature application—may be used in its then present form. If however the impregnated body is designated for use above 1000° C., it will be subjected to a firing process at temperatures of the order of 1100° C.

The silica composition utilized in the initial step of the impregnation process is preferably an ammonium stabilized, aqueous colloidal dispersion of discrete particles of surface-hydroxylated silica. The materials utilized should be essentially free from sodium, as this element is notably detrimental to any material used as an antioxidant. Suitable colloidal silica compositions of the type specified are available from the Du Pont Corporation, Wilmington, Delaware, under the designation "Ludox AS."

Initially the sample to be impregnated, as for example a piece of machined graphite, may be subjected in a vacuum vessel to a 1 to 2 mm. mercury pressure vacuum for a sustained period, e.g., of the order of 60 minutes. The silica solution, as above, typically 30% $SiO_2$ by weight, is then flowed into the vacuum vessel whereupon atmospheric pressure drives the impregnant into the body. After a period (e.g., 30 minutes) the vessel with graphite and impregnant may be transferred to a high pressure vessel and pressures of the order of 100 p.s.i. used to force impregnant into the accessible pores of the graphite body. The latter is then placed in an oven and slowly heated to temperatures of about 150° C. This curing step is for the purpose of precipitating (gelating) the colloidal silica in the pores and dehydrating the graphite body. The application of heat should not be too sudden or too high so as to cause exudation of the impregnant.

The methyl borate and methyl phosphate impregnating solution used in the second step of the impregnation process is produced by synthesis. In particular esterification of boric oxide is achieved in accordance with the equation:

(1)   $B_2O_3 + 6ROH \rightarrow 2B(OR)_3 + 3H_2O$

where R is ($CH_3$).

Similarly methyl phosphate is prepared by adding phosphorous pentoxide ($P_2O_5$) to methyl alcohol to esterify the $P_2O_5$ as follows:

(2)   $P_2O_5 + 10ROH = 2P(OR)_5 + 5H_2O$

where R is ($CH_3$).

Methyl borate and methyl phosphate component solutions are preferably prepared separately by addition of about 20% by weight of $B_2O_3$ and $P_2O_5$ to water-free methanol. The two resulting component solutions are then mixed in a 1:1 ratio to yield the impregnating solution used in the second step of the impregnation process. Such impregnating solution thus will contain some 10% $B_2O_3$ and 10% $P_2O_5$ by weight—in the form of methyl borate and methyl phosphate esters.

In accordance with the second step in the impregnation process, the silica impregnated sample is again subjected to vacuum conditions, e.g. for a 60-minute period, and then flooded with the impregnating solution described above. The sample is then typically further pressurized under e.g. 100 p.s.i. conditions to drive more solution into the sample. Thereupon the pressure is released and the sample heat cured at temperatures up to about 150° C.

If the treated body is intended for use in intermediate temperature ranges, e.g., of the order of 450° C. to 800° C., excellent oxidation resistance properties will now be displayed by the treated body, even without further processing.

Especially, however, where the impregnated articles are intended for applications in environments displaying temperatures of over 1000° C., e.g. in the range 800° C. to 1200° C., it is preferable to subject such articles to a firing process. Such firing effectively converts the $B_2O_3$, $P_2O_5$ and $SiO_2$ into an oxidation inhibiting glaze which does not react with the moisture in the air. In a typical firing schedule, the treated article is placed in a high temperature furnace and heated under nitrogen (or similar inert gas) to 1100° C. at a rate of 300° C. per hour and soaked at 1100° C. for 30 minutes. Thereafter the article is cooled.

The remarkable increase in oxidation resistance achieved pursuant to the invention is graphically illustrated in the figure incorporated herein. The data charted therein was secured through use of a conventional globar muffle furnace capable of attaining the desired temperatures 800° C. to 1300° C. For this purpose treated and control samples were placed in a double sagger equipped with a gas inlet. The sagger was placed in the muffle furnace and purged with nitrogen gas until a constant oxidation temperature was attained. As soon as the samples reached the desired temperature, oxidizing air was admitted to the sagger at a constant flow rate of 3000 cc. per minute. The oxidation resistance between 800° C. and 1300° C. was then noted as percentage burn-off in 60 minutes.

The oxidation rate of untreated graphite is illustrated in curve 1 of the figure. It can be seen therein that untreated graphite loses more than 10% of its original weight when exposed to air oxidation for 60 minutes at temepratures 800° C. to 900° C. The high percentage burn-off at 800° C. causes the graphite to lose its structural integrity and to disintegrate under mechanical load.

The oxidation results regarding the treated graphites are illustrated in curves 2 and 3. The latter represent curves fitted to a group of data secured for four different graphite samples. In each instance the test sample following treatment with the $B_2O_3$–$P_2O_5$–$SiO_2$ impregnant was subjected to a firing schedule at 1100° C. in inert atmosphere, as previously set forth.

It will be observed from curves 2 and 3 that the treated graphite samples have a remarkable resistance to oxidation starting at 800° C. It is postulated that such result is obtained because during the firing process, an intimate protective coating is formed over the internal and external surfaces of the graphite body, thus leaving a greatly reduced area or number of active sites where the oxygen of the air can diffuse or chemically combine. The high temperature reactivity is seen to be still more reduced with increasing temperature up to 1100° C. This effect—it is speculated—is caused by the treatment forming a semi-liquid phase of increasing wettability toward graphite and therefore covering a greater area of the graphite surfaces.

While the present invention has been particularly described in terms of specific embodiments thereof, it will be understood in view of the disclosure herein, that numerous variations upon the invention are now enabled to those skilled in the art, which variations are yet in propriety within the true scope of the instant teaching. Accordingly the invention is to be broadly construed and limited only by the scope and spirit of the claims now appended hereto.

I claim:

1. A method for treating a carbon or graphite article to increase the oxidation resistance thereof, comprising: impregnating said article by differential pressure in separate steps with an aqueous colloidal dispersion of particulate silica and with an impregnant solution of methyl borate and methyl phosphate esters in methyl alcohol.

2. A method according to claim 1 wherein said impregnation with said silica is effected first and said esters are applied subsequently.

3. A method according to claim 2, further including heat drying of said article.

4. A method according to claim 3, further including firing said article in an inert atmosphere at temperatures over 1000° C.

5. A method in accordance with claim 4, wherein said impregnant solution is such that the equivalent of about 10% by weight of $B_2O_3$ and 10% by weight of $P_2O_5$ is present therein, and wherein said aqueous dispersion contains about 30% by weight of silica.

6. A method according to claim 5, wherein said impregnant solution is prepared by separately reacting $B_2O_3$ and $P_2O_5$ with methyl alcohol to esterify said $B_2O_3$ and $P_2O_5$, and then mixing the resulting component solutions to yield said impregnating solution.

7. A carbon or graphite article exhibiting increased resistance to oxidation in the utilization range of about 800° C. to 1200° C., the accessible pores of said article being filled with an impregnant composition consisting of particulate silica and a mixture of methyl borate and methyl phosphate esters.

8. A product in accordance with claim 7 wherein said impregnant composition has been fired in said pores to temperatures over 1000° C. to produce a protective coating over the surfaces thereof.

References Cited

UNITED STATES PATENTS

| 3,342,627 | 9/1967 | Paxton | 117—169 A |
| 577,499 | 2/1897 | Bower et al. | 117—228 |
| 3,553,010 | 1/1971 | Rubisch | 117—169 R |
| 3,206,327 | 9/1965 | Dicterdorf | 117—169 R |

FOREIGN PATENTS

| 876,091 | 8/1961 | Great Britain | 117—169 R |

ALFRED L. LEAVITT, Primary Examiner

M. F. ESPOSITO, Assistant Examiner

U.S. Cl. X.R.

106—52, 69; 117—69, 70 A, 70 B, 70 S, 70 R, 119, 169 R, 228